(12) United States Patent
Okudaira et al.

(10) Patent No.: US 6,562,475 B2
(45) Date of Patent: May 13, 2003

(54) POLYAMIDE LAYERED FILMS

(75) Inventors: Haruo Okudaira, Aichi (JP); Keiji Mori, Aichi (JP); Yukinobu Miyazaki, Aichi (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/880,832

(22) Filed: Jun. 15, 2001

(65) Prior Publication Data

US 2002/0018905 A1 Feb. 14, 2002

(30) Foreign Application Priority Data

Jun. 30, 2000 (JP) .......................................... 2000-197462

(51) Int. Cl.$^7$ ........................... B32B 27/00; B32B 27/08
(52) U.S. Cl. ................. 428/474.4; 428/474.7; 428/475.5; 428/477.7
(58) Field of Search ........................... 428/474.4, 474.7, 428/475.5, 477.7

(56) References Cited

U.S. PATENT DOCUMENTS

| 5,106,693 A | * | 4/1992 | Harada et al. | ............... | 428/412 |
| 5,741,601 A | * | 4/1998 | Kishida et al. | ........... | 428/474.4 |
| 6,376,093 B1 | * | 4/2002 | Fujita et al. | ............. | 428/474.4 |

* cited by examiner

*Primary Examiner*—P. Hampton-Hightower

(57) ABSTRACT

The present invention provides polyamide layered films suitable for packaging applications, each film having a base layer made of a polyamide polymer and an easy-sliding layer made of a polyamide polymer containing inorganic fine particles at 0.15 to 3.00 wt %, the easy-sliding layer being formed on at least one surface of the base layer, and the first static friction coefficient between the easy-sliding layer side surfaces of the layered films at 23° C. in a 65% RH atmosphere being 0.70 or lower, or the second static friction coefficient between the easy-sliding layer side surfaces of the layered films at 23° C. in a 80% RH atmosphere being 0.95 or lower.

3 Claims, 1 Drawing Sheet

POLYAMIDE LAYERED FILMS

FIELD OF INVENTION

The present invention relates to polyamide layered films and more particularly to polyamide layered films suitable for packaging applications, which exhibit excellent sliding properties, transparency, and flex fatigue resistance, and which have good processing suitability in the step of printing or lamination when used as various packaging materials.

BACKGROUND OF THE INVENTION

In the past, unstretched films or stretched films made of polyamide polymers, typical examples of which are nylon 6 and nylon 66, have been widely used as various packaging materials because they exhibit excellent strength and gas barrier properties as compared with films made of other ordinary polymers, thereby producing favorable effects; for example, they can prevent spoilage of contents when used as packaging materials for food packaging, particularly packaging of water-containing food, and furthermore, they can prevent package breaking that will be caused by vibration or shock during transportation.

The above conventional unstretched films or stretched films made of polyamide polymers have drawbacks that they can only exhibit poor sliding properties in a high humidity atmosphere and they may make many troubles, including printing failure or lamination failure, which will be caused by wrinkle generation in the processing step such as printing or lamination, so that workability cannot be improved at the time of film processing.

To solve the above drawbacks, there have been made many attempts, including addition of inorganic fine particles or organic lubricating agents in large quantities to polyamide polymer films, or application of a coating solution containing inorganic fine particles to polyamide polymer films, which, however, lead to deterioration of film transparency and complication of film producing processes, resulting in an increase in production cost; therefore, the above conventional unstretched films or stretched films made of polyamide polymers have not yet come to a satisfactory level.

SUMMARY OF THE INVENTION

Under these circumstances, the present inventors have extensively studied to solve the drawbacks of the above conventional unstretched films or stretched films made of polyamide polymers and to develop polyamide layered films suitable for packaging applications, which exhibit excellent film quality required for packaging films, including sliding properties, transparency, and flex fatigue resistance, and which have good processing suitability in the step of printing or lamination when used as various packaging materials, so that processing failure can be reduced and workability can be improved. As a result, they have found that such polyamide layered films can be obtained by formation of easy-sliding layers made of polyamide polymers containing specific amounts of inorganic fine particles and by control of static friction coefficient under specific conditions, thereby completing the present invention.

The present invention provides a polyamide layered film comprising a base layer made of a polyamide polymer and an easy-sliding layer made of a polyamide polymer containing inorganic fine particles at 0.15 to 3.00 wt %, the easy-sliding layer being formed on at least one surface of the base layer, and the first static friction coefficient between the easy-sliding layer side surfaces of the layered films at 23° C. in a 65% RH atmosphere being 0.70 or lower.

This polyamide layered film can be effectively used as various packaging materials because they exhibit excellent film sliding properties, transparency, and flex fatigue resistance, and have good processing suitability in the step of printing or lamination, so that processing failure can be reduced and workability can be improved at the time of film processing.

The present invention further provides a polyamide layered film comprising a base layer made of a polyamide polymer and an easy-sliding layer made of a polyamide polymer containing 0.15 to 3.00 wt % inorganic fine particles, the easy-sliding layer being formed on at least one surface of the base layer, and the second static friction coefficient between the easy-sliding layer side surfaces of the layered films at 23° C. in a 80% RH atmosphere being 0.95 or lower.

This polyamide layered film can be effectively used as various packaging materials because they exhibit excellent film sliding properties, transparency, and flex fatigue resistance, and have good processing suitability in the step of printing or lamination, so that processing failure can be reduced and workability can be improved at the time of film processing, particularly in a high humidity atmosphere.

BRIEF DESCRIPTION OF THE DRAWINGS

FIG. 1(*b*) is a cross-sectional view of another example of the polyamide layered films of the present film.

DETAILED DESCRIPTION OF THE INVENTION

Figure 1A:
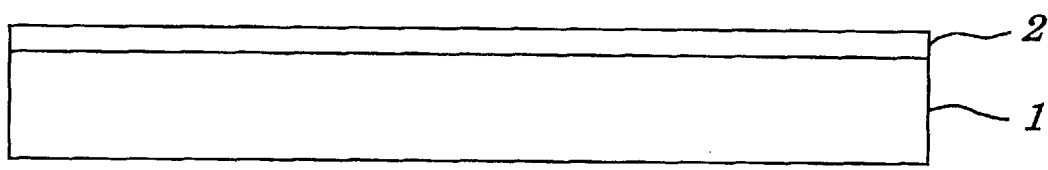
FIG. 1(*a*) is a cross-sectional view of one example of the polyamide layered films of the present invention.

The polyamide polymer which can be used in the present invention may include fatty acid polyamides such as nylon 6, nylon 6-6, nylon 12, and nylon 6-10. In addition, there can also be used copolymers composed mainly of nylon 6/6-6, nylon 6/6-10, nylon 6-6/6-10, or ε-caprolactam, and containing small amounts of copolymerized components such as nylon salts of hexamethylenediamine and isophthalic acid or nylon salts of m-xylylenediamine and adipic acid; polyamide block copolymers consisting of hard segments formed by polyamide components and soft segments formed by polyoxyalkylene glycol components; m-xylylene group-containing polyamide polymers composed of m-xylylenediamine, or a mixed xylylenediamine consisting of m-xylylenediamine and p-xylylenediamine, as the main diamine component, and α,ω-fatty acid dicarboxylic acid of 6 to 12 carbon atoms as the main dicarboxylic acid component; aromatic polyamides; and mixed polymers of these polyamides.

The inorganic fine particles which can be used in the present invention may include calcium carbonate, silicon dioxide, barium sulfate, magnesium oxide, alumina, and zeolite. In addition, there can also be used those prepared by various coating treatments on the surface of these fine particles. These inorganic fine particles may have a spherical, cubic, cylindrical, conical, discoidal, amorphous, or any other shape, depending upon the purpose of film use.

These inorganic fine particles may have a mean particle size that can be adjusted depending upon the required sliding properties or transparency, and therefore, is not particularly limited; when the polyamide layered films of the present invention are used as packaging materials, they may usually contain inorganic fine particles having a mean particle size of 1.0 to 5.0 μm.

The amount of inorganic fine particles contained in the easy-sliding layer made of a polyamide polymer is usually in the range of 0.15 to 3.00 wt %, preferably 0.30 to 1.00 wt %. When the amount of inorganic fine particles is smaller than 0.15 wt %, only a small effect will be produced on the improvement of sliding properties. Amounts greater than 3.00 wt % will cause some problems, including transparency failure and an increase in filter pressure in the producing process.

For the polyamide layered films of the present invention, the first static friction coefficient between the surfaces of the easy-sliding layers made of polyamide polymers containing inorganic fine particles at 0.15 to 3.00 wt %, at 23° C. in a 65% RH atmosphere is 0.70 or lower, or the second static friction coefficient between the easy-sliding layer side surfaces at 23° C. in a 80% RH atmosphere is 0.95 or lower. The polyamide layered films of the present invention can therefore maintain sliding properties, even in high humidity, to improve their processing suitability in the step of printing or lamination.

The fatty acid amides or fatty acid bis-amides, which can be used in the present invention, may include erucamide, stearamide, ethylene-bis-stearamide, and ethylene-bis-oleamide.

At least one of the base layer made of a polyamide polymer and the easy-sliding layer made of a polyamide polymer containing inorganic fine particles at 0.15 to 3.00 wt % may preferably contain at least one selected from fatty acid amide and fatty acid bis-amides. The amounts of fatty acid amides and/or fatty acid bis-amides contained may preferably be in the range of 0.01 to 0.40 wt %, more preferably 0.05 to 0.20 wt %. When the amounts of fatty acid amides and/or fatty acid bis-amides are smaller than 0.01 wt %, only a small effect will be produced on the improvement of sliding properties. When the amounts are greater than 0.04 wt %, film transparency may become unsatisfactory, or spots may be generated on the film surface by their bleeding onto the film surface with the lapse of time. To obtain satisfactory film quality for packaging materials, fatty acid amides and/or fatty acid bis-amides may preferably be contained in the range of 0.01 to 0.40 wt %.

In the polyamide layered films of the present invention, the thickness ratio of the easy-sliding layer made of a polyamide polymer containing inorganic fine particles at 0.15 to 3.00 wt % in the layered film (when the easy-sliding layer is formed on each surface of the base layer, this ratio means their total thickness ratio) is usually in the range of 2% to 60%, preferably 5% to 20%. When the thickness ratio of the easy-sliding layer made of a polyamide polymer containing inorganic fine particles at 0.15 to 3.00 wt % in the layered film is lower than 2%, sliding properties may become poor by loss of inorganic fine particles. When the ratio is higher than 60%, film transparency may become unsatisfactory, resulting in an appearance failure for packaging materials.

The polyamide layered films of the present invention may preferably have a haze of 6% or lower, in which case their printed matter may have good appearance and it can therefore be said to produce an effect on goods appeal of printed matter as required for packaging materials.

The addition of inorganic fine particles to polyamide polymers can be carried out by any known method, for example, by addition at the time of polymerization, or by preparing a master batch through addition at the time of melt extrusion with an extruder and then using this master batch for addition to polyamide polymers in the production of films.

The polyamide polymers forming the base layer and the easy-sliding layer in the present invention may contain, if necessary, other thermoplastic resins, including polyester polymers such as polyethylene terephthalate, polybutylene terephthalate, and polyethylene 2,6-naphthalate; and polyolefin polymers such as polyethylene and polypropylene, to such an extent that addition is not harmful to their characteristics.

Furthermore, various additives, including antistatic agents, antifogging agents, thermal stabilizers, ultraviolet light absorbers, dyes, and pigments, may be added, if necessary, to one or both of the base layer made of a polyamide polymer and the easy-sliding layer made of a polyamide polymer containing inorganic fine particles at 0.15 to 3.00 wt %.

For the polyamide layered films of the present invention, their film thickness is not particularly limited; when used as packaging materials, they may usually have a thickness of 100 μm or less, more usually in the range of 5 to 50 μm.

The polyamide layered films of the present invention can be produced by any known method of production, for example, by melting the polymers forming the respective layers with separate extruders and then co-extruding them into two layers or three layers from a pair of dies; or by melt extruding the polymers forming the respective layers separately into film shape and then layering these films by the lamination method; or by a combination of these procedures.

Figure 1B:
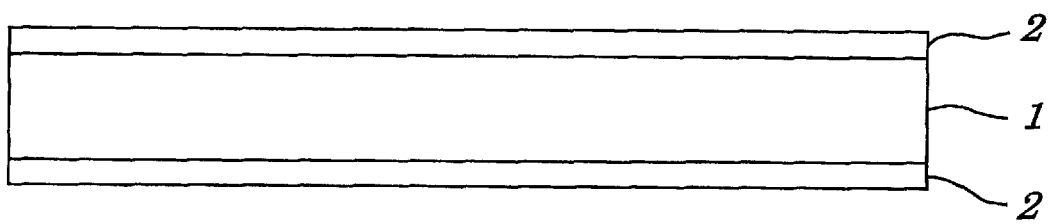

In the polyamide layered films of the present invention, each layer may be either an unstretched film or a stretched film; however, to improve the transparency or processing suitability of the layered film, it is desirable that each layer is a uni-axially or bi-axially stretched film layer. Stretching can be carried out by any known method, for example, flat-type successive bi-axial stretching, flat-type simultaneous bi-axial stretching, or tubular method. The resulting unstretched or stretched films can be obtained in the form of two-layer films (easy-sliding layer 2/base layer 1; see FIG. 1(a)) or three-layer films (easy-sliding layer 2/base layer 1/easy-sliding layer 2; see FIG. 1(b)).

EXAMPLES

The present invention will hereinafter be further illustrated by some examples; however, the present invention is not limited to these examples. The determination of characteristics set forth herein was carried out by the following methods.

(1) Relative Viscosity

Polyamide polymers were measured for relative viscosity with 96% sulfuric acid in a concentration of 1 g/dl at 20° C. using an Ubbelohde viscometer.

(2) Mean Particle Size of Inorganic Fine Particles

The mean particle size of inorganic fine particles was determined by the Coulter counter method.

(3) Haze

According to JIS-K-7105, haze was determined with a direct reading hazemeter available from Toyo Seiki Seisaku-Sho, Ltd.

Haze (%)=[Td (% diffuse transmittance)/Tt (% total light transmittance)]×100

(4) Static Friction Coefficient (a) First Static Friction Coefficient

According to JIS-K-7125, the static friction coefficient between the easy-sliding layer side surfaces was determined at 23° C. in a 65% RH atmosphere and defined as the first static friction coefficient.

(b) Second Static Friction Coefficient (Static Friction Coefficient in High Humidity)

A film was humidity controlled in a thermostatic and humidistatic chamber at 23° C., 80% RH for 24 hours, and then immediately, according to JIS-K-7125, the static friction coefficient between the easy-sliding layer side surfaces was determined at 23° C. in a 65% RH atmosphere and defined as the second static friction coefficient.

(5) Flex Fatigue Resistance (Number of Pinholes)

A film was cut into a circular shape of 150 mm in diameter, and made into a balloon-shaped air-containing bag, which was then attached to the end of a glass tube in the following flex tester. The flex tester repeated alternately the supply of compressed air (at a pressure of 70 kPa) and exhaustion (to a reduced pressure of 1000 hPa) to provide the balloon-shaped bag film with a repetition of expansion and contraction at a rate of 7.5 times/min., making flex fatigue. The above bag film was given flex fatigue 2000 times at 23° C. in a 65% RH atmosphere, and the number of pinholes generated on the film was counted by visual observation.

(6) Processing Suitability

Using a gravure printing machine at 24° C. in a 70% RH atmosphere, a film was rewound by 1000 meters at a rate of 100 m/min., and processing suitability was evaluated as follows.

Good: No wrinkles are generated on the roll, meaning that processing suitability is good;

Fair: Wrinkles are sometimes generated on the end portions of the roll, requiring the adjustment of processing conditions;

Poor: Wrinkles are generated both on the end portions and on the center portion of the roll, which generation is not avoided even by adjusting the processing conditions.

Example 1

An unstretched sheet having a base layer and an easy-sliding layer formed thereon was prepared using a two-different-layer co-extrusion T-die equipment. The unstretched sheet had the total thickness of 180 μm, and the thickness ratio of the easy-sliding layer to the total thickness was 6.7%.

1) Composition forming the base layer: a polymer composition consisting of 97.00 wt % nylon 6 (relative viscosity=2.8) and 3.00 wt % poly-m-xylyleneadipamide (relative viscosity=2.1).

2) Composition forming the easy-sliding layer: a polymer composition consisting of 96.55 wt % nylon 6 (relative viscosity=2.8), 3.00 wt % poly-m-xylyleneadipamide (relative viscosity=2.1), 0.15 wt % ethylene-bis-stearamide, and 0.30 wt % silicon dioxide (mean particle size, 1.9 μm).

The resulting unstretched sheet was stretched at a ratio of 3.15 times in the machine direction and then at a ratio of 3.8 times in the transverse direction to give a bi-axially stretched film of 15 μm in thickness. The resulting bi-axially stretched film was measured for the first static friction coefficient, the second static friction coefficient, haze, the number of pinholes, and processing suitability. The results are shown in Table 1.

Example 2

A bi-axially stretched film was prepared in the same manner as described in Example 1, except that the following change was made.

1) Composition forming the easy-sliding layer: a polymer composition consisting of 96.25 wt % nylon 6 (relative viscosity=2.8), 3.00 wt % poly-m-xylyleneadipamide (relative viscosity=2.1), 0.15 wt % ethylene-bis-stearamide, and 0.60 wt % silicon dioxide (mean particle size, 1.9 μm).

The resulting bi-axially stretched film was measured for the first static friction coefficient, the second static friction coefficient, haze, the number of pinholes, and processing suitability. The results are shown in Table 1.

Example 3

A bi-axially stretched film was prepared in the same manner as described in Example 1, except that the following change was made.

1) Composition forming the easy-sliding layer: a polymer composition consisting of 96.00 wt % nylon 6 (relative viscosity=2.8), 3.00 wt % poly-m-xylyleneadipamide (relative viscosity=2.1), and 1.00 wt % silicon dioxide (mean particle size, 1.9 μm).

The resulting bi-axially stretched film was measured for the first static friction coefficient, the second static friction coefficient, haze, the number of pinholes, and processing suitability. The results are shown in Table 1.

Comparative Example 1

A bi-axially stretched film was prepared in the same manner as described in Example 1, except that the following change was made.

1) Composition forming the easy-sliding layer: a polymer composition consisting of 96.72 wt % nylon 6 (relative viscosity=2.8), 3.00 wt % poly-m-xylyleneadipamide (relative viscosity=2.1), 0.15 wt % ethylene-bis-stearamide, and 0.13 wt % silicon dioxide (mean particle size, 1.9 μm).

The resulting bi-axially stretched film was measured for the first static friction coefficient, the second static friction coefficient, haze, the number of pinholes, and processing suitability. The results are shown in Table 1.

Comparative Example 2

A bi-axially stretched film was prepared in the same manner as described in Example 1, except that the following change was made. For both the base layer and the easy-sliding layer, the following polymer composition was used.

1) Composition forming the base layer and the easy-sliding layer: a polymer composition consisting of 6.00 wt % nylon 6 (relative viscosity=2.8), 93.97 wt % poly-m-xylyleneadipamide (relative viscosity=2.1), and 0.03 wt % silicon dioxide (mean particle size, 1.9 μm).

The resulting bi-axially stretched film was measured for the first static friction coefficient, the second static friction coefficient, haze, the number of pinholes, and processing suitability. The results are shown in Table 1.

TABLE 1

| Films | First static friction coefficient 23° C., 65% RH | Second static friction coefficient 23° C., 80% RH | Haze (%) | Number of pinholes | Processing suitability |
| --- | --- | --- | --- | --- | --- |
| Example 1 | 0.37 | 0.50 | 2.6 | 0 | good |
| Example 2 | 0.36 | 0.41 | 4.7 | 0 | good |
| Example 3 | 0.47 | 0.49 | 4.7 | 0 | good |
| Comp. Ex. 1 | 0.80 | 1.09 | 1.4 | 0 | fair |
| Comp. Ex. 2 | 1.20 | 1.64 | 2.3 | 12 | fair |

The polyamide layered films of the present invention exhibit excellent sliding properties, transparency, and flex fatigue resistance, and have good processing suitability in the step of printing or lamination when used as various packaging materials, so that processing failure can be reduced and workability can be improved at the time of film processing; therefore, they are suitable for various packaging applications, including food and drugs.

What is claimed is:

1. A polyamide layered film comprising a base layer made of a polyamide polymer and an easy-sliding layer having a lower coefficient of friction than the base layer and made of a polyamide polymer containing inorganic fine particles at 0.15 to 3.00 wt %, the easy-sliding layer being formed on at least one surface of the base layer, and the first static friction coefficient between the easy-sliding layer side surfaces of the layered films at 23° C. in a 65% RH atmosphere being 0.70 or lower and the second static friction coefficient between the easy-sliding layer side surfaces of the layered films at 23° C. in a 80% RH atmosphere being 0.95 or lower, wherein at least one of the polyamide polymer forming the base layer or the easy-sliding layer contains at least one selected from fatty acid amides and fatty acid bisamides at 0.01 to 0.40 wt %.

2. The polyamide layered film according to claim 1, wherein the easy-sliding layer has a thickness that is 2% to 60% of the thickness of the polyamide layered film.

3. The polyamide layered film according to claim 1, wherein the polyamide layered film has a haze of 6% or lower.

* * * * *